Patented Oct. 28, 1924.

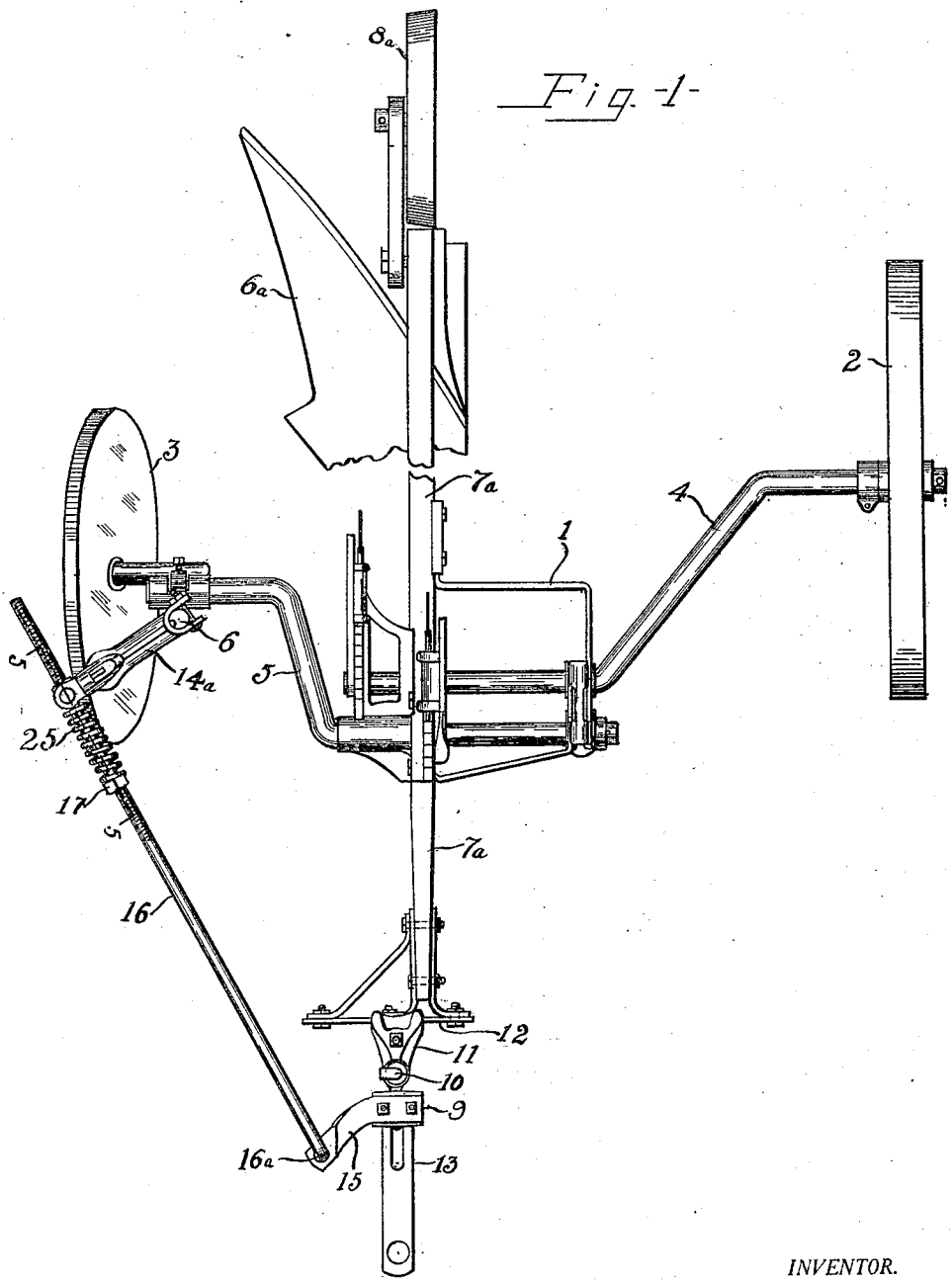

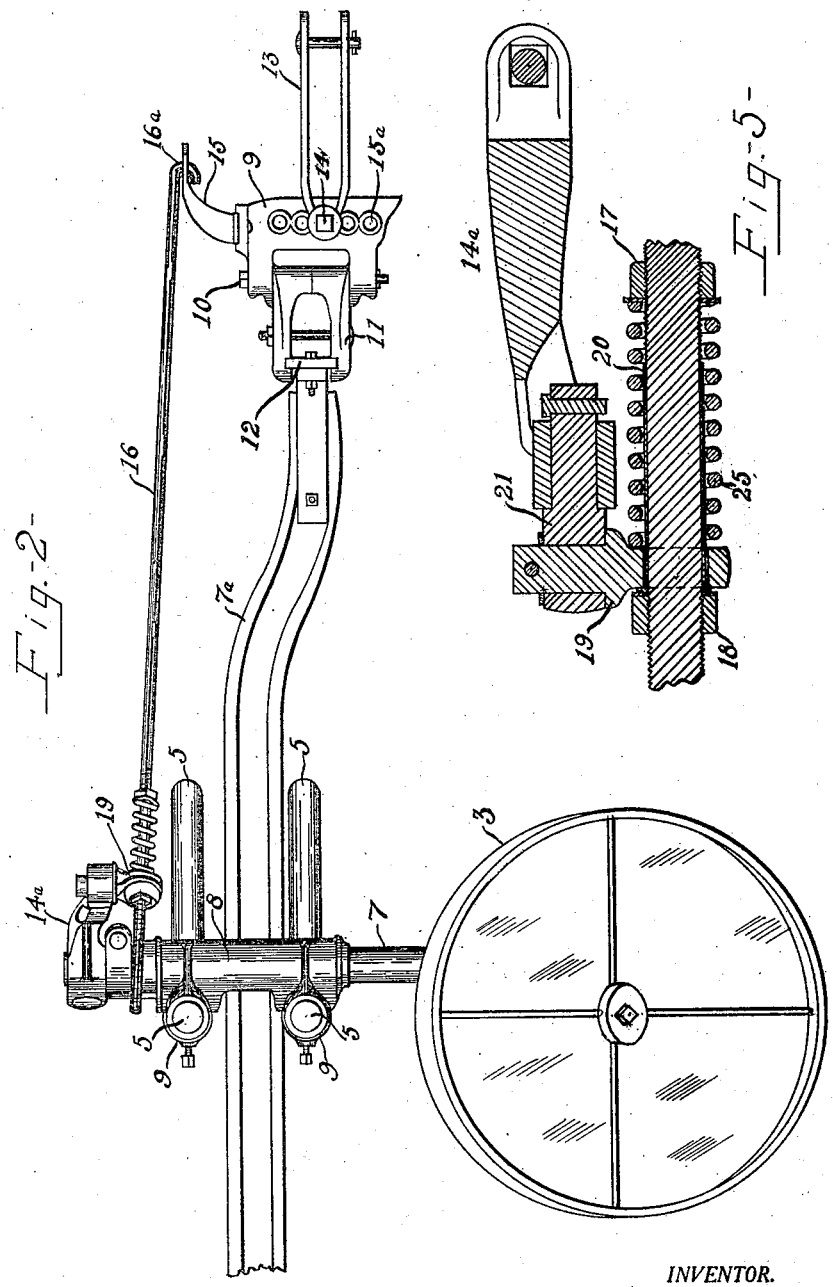

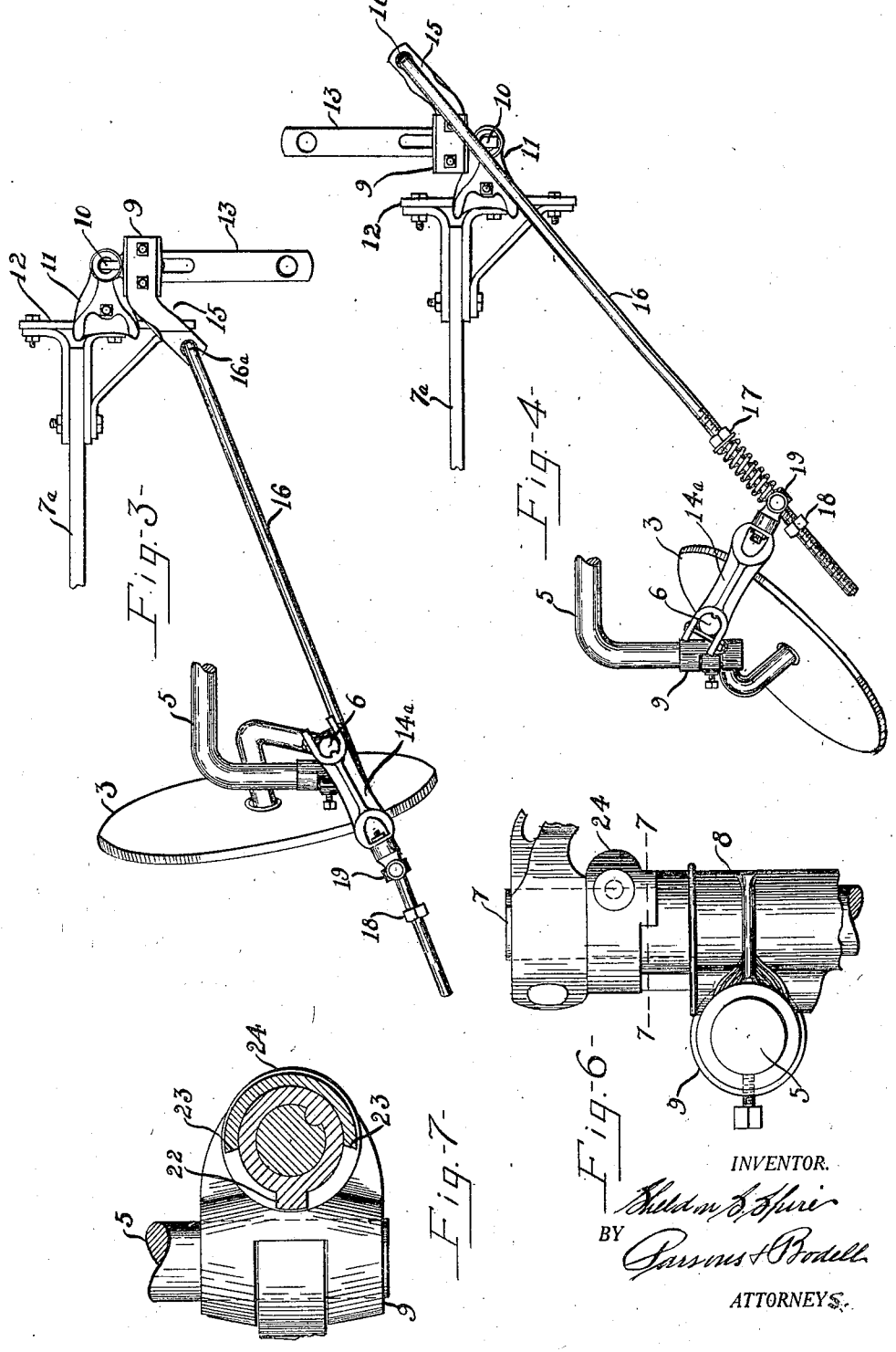
Oct. 28, 1924.
S. S. SPIRE
SULKY PLOW
Filed Nov. 28, 1919
1,513,678
3 Sheets-Sheet 3

1,513,678

UNITED STATES PATENT OFFICE.

SHELDON S. SPIRE, OF SYRACUSE, NEW YORK, ASSIGNOR TO SYRACUSE CHILLED PLOW COMPANY, OF SYRACUSE, NEW YORK, A CORPORATION OF NEW YORK.

SULKY PLOW.

Application filed November 28, 1919. Serial No. 341,073.

*To all whom it may concern:*

Be it known that I, SHELDON S. SPIRE, a citizen of the United States, and a resident of Syracuse, in the county of Onondaga and State of New York, have invented a certain new and useful Sulky Plow, of which the following is a specification.

This invention relates to sulky plows and has for its object a particularly simple and efficient connection between the draft member, clevis or other part which turns with the draft animals or tractor, and the caster wheel, which means cannot move into a dead center line.

The invention consists in the novel features and in the combinations and constructions hereinafter set forth and claimed.

In describing this invention, reference is had to the accompanying drawings in which like characters designate corresponding parts in all the views.

Figure 1 is a plan view of a sulky plow embodying my invention.

Figure 2 is a fragmentary side elevation thereof.

Figures 3 and 4 are fragmentary plan views illustrating the position of the parts when the plow is being turned to the right and to the left respectively.

Figure 5 is an enlarged sectional view, partly broken away, on the plane of line 5—5, of Fig. 1.

Figure 6 is an enlarged fragmentary view showing in elevation, the upper end of the upright bearing for the axle of the caster wheel and contiguous parts.

Figure 7 is a sectional view on line 7—7, Fig. 6.

This sulky plow in so far as my invention is concerned, comprises a caster wheel, a draft member, connections between the draft member and the caster wheel including a rock arm associated with the caster wheel, a rod connecting the draft member and said rock arm, and means for controlling the castering of the wheel by the rod.

The sulky plow may be of any suitable form, size and construction. 1 designates the frame thereof. 2 and 3 are respectively, the ground and furrow wheels mounted on crank axles 4, 5; the furrow wheel 3 not being mounted directly upon the axle 5 but being mounted upon the spindle 6 of an axle having an upwardly extending portion 7 journaled in an upright bearing 8 which also has transverse horizontal bearings 9 arranged one above the other and in which the outer ends of the crank axles 5 are mounted, it being understood that there are two of such axles 5 arranged one above the other in parallelism to each other.

$6^a$ is the plow bottom carried by a suitable beam $7^a$ which in turn is supported by the frame 1.

$8^a$ is the rear wheel.

9 is a draft member or clevis pivoted at 10 to a bracket 11 mounted on and adjustable along a cross bar 12 at the front end of the beam $7^a$.

13 is a link connected to the clevis by a bolt 14 extending through in one of a series of holes $15^a$ arranged one above the other in the clevis 9. The draft animal or the tractor is connected to this link 13.

$14^a$ is a laterally extending rock arm mounted upon the upper end of the portion 7 of the caster wheel axle above the bearing 8.

15 is a rock arm mounted on a draft member 9 and normally extending laterally therefrom.

16 is a rod connecting the rock arms $14^a$, 15, it being pivotally connected to the rock arm 15 at $16^a$ and being connected to the rock arm $14^a$ by a sliding and pivotal connection.

As here shown, the rod 16 is formed with spaced apart shoulders as front and rear nuts 17 and 18 threading thereon and the portion of the rod between these nuts slides through an eye 19 provided on the arm $14^a$, the portion of the rod 16 between the nuts 17, 18 being covered by a sleeve 20 which facilitates the sliding of the rod in the eye 19 and prevents abrasion of the threads on the rod.

The shoulders or nuts 17, 18 are adjustable lengthwise of the rod to the proper positions for the particular plow to which the rod is applied or to the plowing conditions under which the plow is working.

The eye 19 is usually swivelled, and as here shown it is swivelled to a coupling piece 21, which in turn is swivelled on a horizontal axis to the arm $14^a$, the axis of the coupling 21 extending lengthwise or radially of the arm $14^a$. The eye 19 depends from the coupling 21 and is located below the horizontal plane of the upper end of the upright portion 7 of the caster wheel axle. The swivelling of the caster wheel is controlled and limited by means of a peripheral shoulder 22 on the upright portion 7 of the caster wheel axle and fixed abutments between which the shoulder 22 moves. The shoulder 22 is formed on a collar on the upright portion 7 of the caster wheel axle and the abutments 23 are the end wall of a cutout or slot formed in a normally non-rotatable collar 24 at the upper end of the bearing 8. During castering of the wheel, the shoulder 22 engaging with one or the other of the abutments 23 limits the castering movement, so that especially when the plow is turning to the right, the rod 16 and arm 14 cannot move into a dead center line.

Preferably, a spring 25 is interposed between the front shoulder 17 and the eye 19 to resist sliding movement of the rod when turning to the right and yieldingly permitting the rod to slide and hence prevent buckling thereof when castering of the wheel is obstructed or when limited.

In operation, when the plow is turned to the left, as shown in Fig. 4, the rear shoulder 18 on the rod engages the rear side of the eye 19 and turns the caster wheel axle and during the turning of the plow to the left as shown in Fig. 3 the force is yieldingly applied to the caster wheel axle.

What I claim is:—

1. In a sulky plow an axle having an upward extending portion, a bearing in which said portion is journalled, a rock arm fixed upon said upward extending portion, means for limiting the turning movement of the rock arm, a draft member, means connecting the draft member and said arm to cause the wheel to caster during the turning of the sulky, said means comprising a push and pull rod connected to said arm and a spring between the rod and said arm and arranged to permit the rod to yield relative to said arm when the turning of the axle is limited by the first mentioned means.

2. In a sulky plow, a caster wheel, an axle having an upwardly extending portion, a bearing in which said portion is journaled, a rock arm mounted on said portion, a draft member, a coupling mounted on said arm to turn about a radial horizontal axis, an eye swiveled on a vertical axis in the coupling, a draft member, means for connecting the draft member and said arm to cause the wheel to caster during turning of the sulky comprising a rod slidable in the eye, and a spring acting on the rod and the arm to permit movement of the rod relatively to the eye, substantially as and for the purpose set forth.

In testimony whereof, I have hereunto signed my name, at Syracuse, in the county of Onondaga, and State of New York this 17th day of November, 1919.

SHELDON S. SPIRE.